United States Patent
Hamaguchi

(10) Patent No.: US 8,313,387 B2
(45) Date of Patent: Nov. 20, 2012

(54) CAGE FOR CONSTANT VELOCITY UNIVERSAL JOINT

(75) Inventor: Hiromitsu Hamaguchi, Iwata (JP); Yasunori Hamaguchi, legal representative, Nisshin (JP); Yumiko Yokoyama, legal representative, Iwata (JP)

(73) Assignee: NTN Corporation, Osaka (JP)

( * ) Notice: Subject to any disclaimer, the term of this patent is extended or adjusted under 35 U.S.C. 154(b) by 218 days.

(21) Appl. No.: 12/864,732

(22) PCT Filed: Jan. 5, 2009

(86) PCT No.: PCT/JP2009/050001
§ 371 (c)(1),
(2), (4) Date: Jul. 27, 2010

(87) PCT Pub. No.: WO2009/096200
PCT Pub. Date: Aug. 6, 2009

(65) Prior Publication Data
US 2011/0045914 A1    Feb. 24, 2011

(30) Foreign Application Priority Data
Jan. 30, 2008   (JP) .................................. 2008-019491

(51) Int. Cl.
*F16D 3/224*   (2011.01)

(52) U.S. Cl. ........................................ 464/145; 464/906

(58) Field of Classification Search .......... 464/144–146, 464/906; 384/51, 625; 29/898.067, 898.13; 451/52
See application file for complete search history.

(56) References Cited

U.S. PATENT DOCUMENTS 4,834,400 A * 5/1989 Lebeck ..................... 384/625 X
4,973,068 A   11/1990 Lebeck
5,586,826 A * 12/1996 Kellstrom et al. ........ 384/625 X
2002/0077186 A1   6/2002 Hosoya et al.
2008/0146354 A1   6/2008 Une et al.

FOREIGN PATENT DOCUMENTS

| | | |
|---|---|---|
| EP | 1 845 274 | 10/2007 |
| JP | 07-310752 | 11/1995 |
| JP | 2002-188653 | 7/2002 |
| JP | 2006-214540 | 8/2006 |
| JP | 2007-232033 | 9/2007 |

OTHER PUBLICATIONS

International Preliminary Report on Patentability and Written Opinion of the International Searching Authority issued Sep. 10, 2010 in International (PCT) Application No. PCT/JP2009/050001.
International Search Report issued Mar. 10, 2009 in International (PCT) Application No. PCT/JP2009/050001.
Chinese Office Action issued Jul. 4, 2012 in corresponding Chinese Application No. 200980102449.6.

* cited by examiner

*Primary Examiner* — Gregory Binda
(74) *Attorney, Agent, or Firm* — Wenderoth, Lind & Ponack, L.L.P.

(57) ABSTRACT

A cage for a constant velocity universal joint include, an outer diameter surface guided by an outer joint member; an inner diameter surface guided by an inner joint member; and pockets for accommodating multiple balls which are interposed between the outer joint member and the inner joint member. A spherical surface roughness in a range extending from an axial center of the inner diameter surface to an end side of the inner diameter surface which corresponds to an opening side of the outer joint member is different from a spherical surface roughness in a range extending from the axial center of the inner diameter surface to an end side of the inner diameter surface which corresponds to an inner side of the outer joint member.

6 Claims, 4 Drawing Sheets

CAGE FOR CONSTANT VELOCITY UNIVERSAL JOINT

BACKGROUND OF THE INVENTION

I. Technical Field

The present invention relates to a cage for a constant velocity universal joint, and more particularly, to a cage for a constant velocity universal joint of a fixed type, which is used in a power transmission system in an automobile or various industrial machines and in which balls are used as rolling bodies.

II. Description of the Related Art

Generally, a constant velocity universal joint is provided with an outer joint member which has track grooves formed on an inner diameter side thereof, an inner joint member which has track grooves formed in an outer diameter side thereof, multiple balls which are interposed between the track grooves of the outer joint member and the track grooves of the inner joint member so as to transmit torque, and a cage which is interposed between the inner diameter surface of the outer joint member and the outer diameter surface of the inner joint member so as to hold the balls.

In the constant velocity universal joint as described above, the outer diameter surface and the inner diameter surface of the cage are brought into contact with the outer race as the outer joint member and an inner race as the inner joint member. Thus, by machining (machining of quenched steel) after a thermal curing process (quenching), the inner diameter surface and the outer diameter surface of the cage secure the dimensional accuracy and the surface roughness thereof (JP 2002-188653 A). As described in JP 2002-188653 A mentioned above, in the case of machining the cage after quenching, the cage is finished such that the surface roughness of the outer diameter surface and the inner diameter surface thereof is uniform over the entire region extending from one end side to the other end side thereof.

SUMMARY OF THE INVENTION

However, in the case where the outer diameter surface of the cage is worked by machining of quenched steel, the machining is generally performed from the end side which corresponds to the inlet side of the outer race to the end side which corresponds to the inner side of the outer race. Therefore, in a range extending from the center of the outer diameter surface of the cage to the end side which corresponds to the inner side of the outer race, the surface roughness is reduced in accordance with the abrasion of a tool. Meanwhile, in the case where the inner diameter surface of the cage is worked by machining of quenched steel, the machining is conversely performed from the end side which corresponds to the inner side of the outer race to the end side which corresponds to the inlet side of the outer race. Therefore, in a range extending from the center of the inner diameter surface of the cage to the end side which corresponds to the inlet side of the outer race, the surface roughness is reduced in accordance with the abrasion of a tool. In this context, in the case where predetermined values of the surface roughnesses cannot be satisfied any longer at the points where the surface roughnesses of the outer diameter surface and the inner diameter surface of the cage are reduced, the life of the tool comes to an end at the time points. In particular, when the tool is expensive, the life of the tool has a large influence on the manufacturing cost. Therefore, the extension of the life of the tool is demanded.

In view of the above-mentioned circumstances, the present invention provides a cage for a constant velocity universal joint, which is capable of extending a life of a cutting tool and achieving reduction in manufacturing cost.

A cage for a constant velocity universal joint according to the present invention includes:

an outer diameter surface guided by an outer joint member;

an inner diameter surface guided by an inner joint member; and pockets for accommodating multiple balls which are interposed between the outer joint member and the inner joint member, in which a spherical surface roughness in a range extending from an axial center of the inner diameter surface to an end side of the inner diameter surface which corresponds to an opening side of the outer joint member is different from a spherical surface roughness in a range extending from the axial center of the inner diameter surface to an end side of the inner diameter surface which corresponds to an inner side of the outer joint member.

According to the cage for a constant velocity universal joint of the present invention, the spherical surface roughness in the range extending from the axial center of the inner diameter surface to the end side which of the inner diameter surface corresponds to the opening side of the outer joint member is different from that in the range therefrom to the end side which of the inner diameter surface corresponds to the inner side, whereby any one of them can be roughly finished. In this manner, the finishing which is performed with use of the cutting tool in the rough range can be roughly completed. That is, the criteria of the life of the tool can be relaxed in the rough range.

It is preferred that the spherical surface roughness in the range extending from the axial center of the inner diameter surface to the end side of the inner diameter surface which corresponds to the opening side of the outer joint member be larger than the spherical surface roughness in the range extending from the axial center of the inner diameter surface to the end side of the inner diameter surface which corresponds to the inner side of the outer joint member. This is because, the track grooves of the outer joint member open on the inlet side (opening side), and hence the influence on the function of the constant velocity universal joint is small even when the spherical surface roughness in the range extending from the axial center to the end side which corresponds to the opening side of the outer joint member is large in the inner diameter surface of the cage.

It is possible to establish $R2<R1<2\times R2$ when the spherical surface roughness in the range extending from the axial center of the inner diameter surface to the end side of the inner diameter surface which corresponds to the opening side of the outer joint member is R1, and the spherical surface roughness in the range extending from the axial center of the inner diameter surface to the end side of the inner diameter surface which corresponds to the inner side of the outer joint member is R2. It is also possible to set the spherical surface roughness in the range extending from the axial center of the inner diameter surface to the end side of the inner diameter surface which corresponds to the inner side of the outer joint member to be equal to or smaller than Ra: 0.8.

Further, a cage for a constant velocity universal joint according to the present invention includes:

an outer diameter surface guided by an outer joint member;

an inner diameter surface guided by an inner joint member; and pockets for accommodating multiple balls which are interposed between the outer joint member and the inner joint member, in which a spherical surface roughness in a range extending from an axial center of the outer diameter surface to an end side which of the outer diameter surface corresponds to an inner side of the outer joint member is different from a spherical surface roughness in a range extending from the axial center of the outer diameter surface to an end side of the outer diameter surface which corresponds to an opening side of the outer joint member.

According to the cage for a constant velocity universal joint of the present invention, the spherical surface roughness in the range extending from the axial center of the outer diameter surface to the end side of the outer diameter surface which corresponds to the inner side of the outer joint member is different from that in the range extending therefrom to the end side of the outer diameter surface which corresponds to the opening side thereof, whereby any one of them can be roughly finished. In this manner, the finishing which is performed with use of the cutting tool in the rough range can be roughly completed. That is, the criteria of the life of the tool can be relaxed in the rough range.

It is preferred that the spherical surface roughness in the range extending from the axial center of the outer diameter surface to the end side of the outer diameter surface which corresponds to the inner side of the outer joint member be larger than the spherical surface roughness in the range extending from the axial center of the outer diameter surface to the end side of the outer diameter surface which corresponds to the opening side of the outer joint member. This is because, the track grooves of the outer joint member open on the inlet side (opening side), and hence the influence on the function of the constant velocity universal joint is small even when the spherical surface roughness in the range extending from the axial center to the end side which corresponds to the inner side of the outer joint member is large in the outer diameter surface of the cage.

It is possible to establish R4<R3<2×R4 when the spherical surface roughness in the range extending from the axial center of the outer diameter surface to the end side of the outer diameter surface which corresponds to the inner side of the outer joint member is R3, and the spherical surface roughness in the range extending from the axial center of the outer diameter surface to the end side of the outer diameter surface which corresponds to the opening side of the outer joint member is R4. It is also possible to set the spherical surface roughness in the range extending from the axial center of the outer diameter surface to the end side of the outer diameter surface which corresponds to the opening side of the outer joint member to be equal to or smaller than Ra: 0.8.

In the cage for a constant velocity universal joint according to the present invention, the finishing which is performed with use of the cutting tool in the rough range can be roughly completed. Thus, the criteria of the life of the tool can be relaxed in the rough range, and hence the life of the cutting tool can be extended, which leads to reduction in manufacturing cost.

Further, the track grooves of the outer joint member open on the inlet side (opening side), and hence the influence on the function of the constant velocity universal joint is small even when the spherical surface roughness in the range extending from the axial center of the inner diameter surface of the cage to the end side of the inner diameter surface which corresponds to the inlet side (opening side) thereof is large, or the spherical surface roughness in the range extending from the axial center of the outer diameter surface of the cage to the end side of the outer diameter surface which corresponds to the inner side thereof is large. Therefore, it is preferred that the spherical surface roughness in the range extending from the axial center to the end side which corresponds to the opening side of the outer joint member be large in the inner diameter surface of the cage. Further, it is preferred that the spherical surface roughness in the range extending from the axial center to the end side which corresponds to the inner side of the outer joint member be large in the outer diameter surface of the cage.

In particular, when the spherical surface roughness in the range extending from the axial center of the inner diameter surface of the cage to the end side of the inner diameter surface which corresponds to the opening side of the outer joint member is R1, and the spherical surface roughness in the range extending from the axial center of the inner diameter surface to the end side of the inner diameter surface which corresponds to the inner side of the outer joint member is R2, R2<R1<2×R2 is established. As a result, the life of the tool can be largely extended. Similarly, when the spherical surface roughness in the range extending from the axial center of the outer diameter surface of the cage to the end side of the outer diameter surface which corresponds to the inner side of the outer joint member is R3, and the spherical surface roughness in the range extending from the axial center of the outer diameter surface to the end side of the outer diameter surface which corresponds to the opening side of the outer joint member is R4, R4<R3<2×R4 is established. As a result, the life of the tool can be largely extended.

Further, when the spherical surface roughness in the range extending from the axial center of the inner diameter surface of the cage to the end side of the inner diameter surface which corresponds to the inner side of the outer joint member, or the spherical surface roughness in the range extending from the axial center of the outer diameter surface of the cage to the end side of the outer diameter surface which corresponds to the opening side of the outer joint member is set to be equal to or smaller than Ra: 0.8, the influence on the function of the constant velocity universal joint can be extremely reduced.

DETAILED DESCRIPTION OF THE INVENTION

An embodiment of a cage for a constant velocity universal joint according to the present invention is described with reference to FIGS. 1 through 3.

Figure 3:
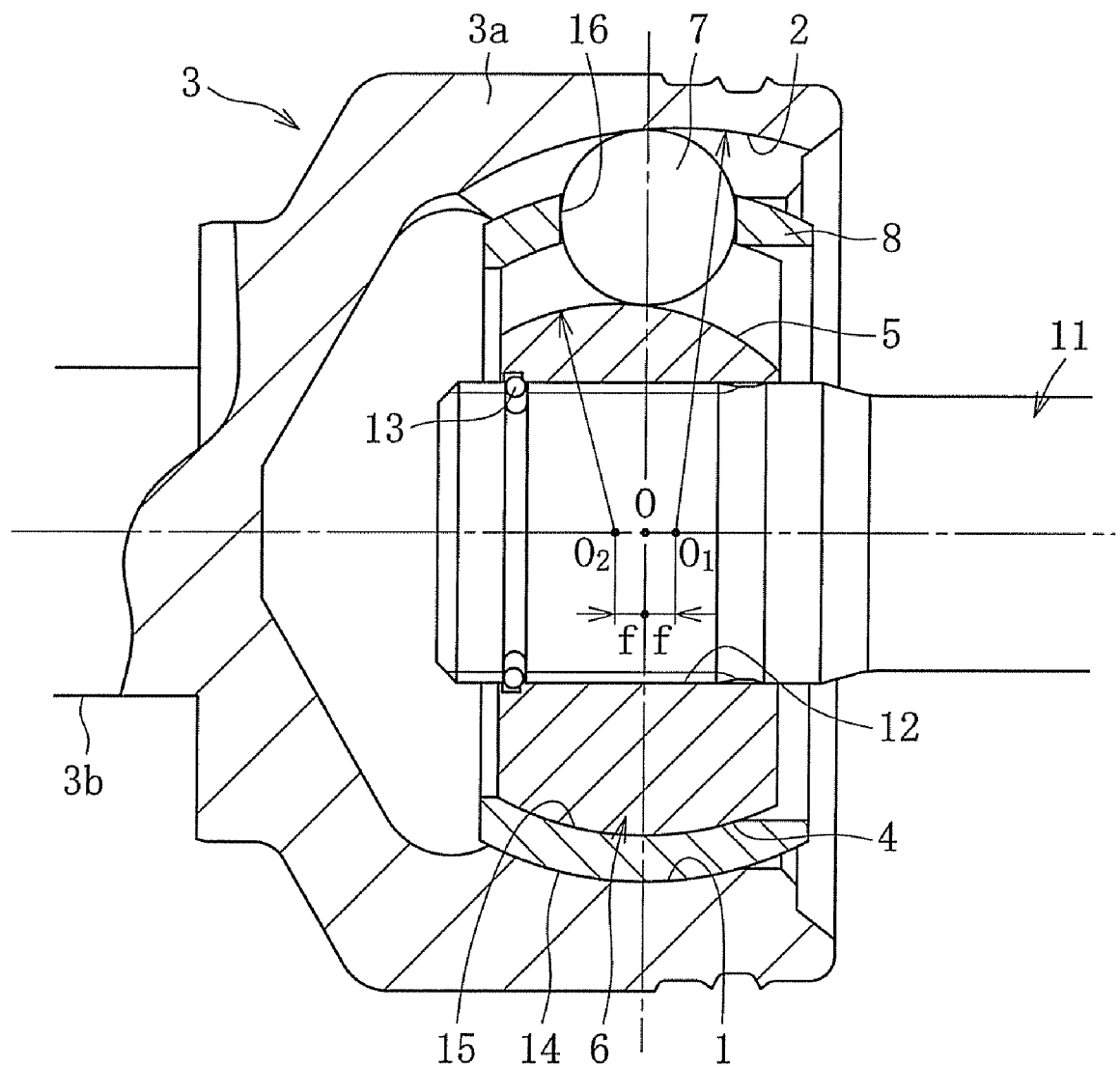
FIG. 3 is a sectional view of a constant velocity universal joint using the cage.

FIG. 3 illustrates a constant velocity universal joint using the cage for a constant velocity universal joint according to the present invention. The constant velocity universal joint includes an outer race 3 as an outer joint member which has ball track grooves 2 (hereinafter, sometimes simply referred to as track grooves 2) formed in an inner diameter surface 1, an inner race 6 as an inner joint member which has ball track grooves 5 (hereinafter, sometimes simply referred to as track grooves 5) formed in an outer diameter surface 4, multiple balls 7 which are interposed between the track grooves 2 of the outer race 3 and the track grooves 5 of the inner race 6 so as to transmit torque, and a cage 8 which is interposed between the inner diameter surface 1 of the outer race 3 and the outer diameter surface 4 of the inner race 6 so as to hold the balls 7. Note that, the outer race 3 is constructed by a bowl-shape mouth portion 3a having the track grooves 2 and a stem portion 3b protruding from the bottom portion of the mouth portion 3a.

A shaft 11 is inserted into a central hole (inner diameter hole) 12 of the inner race 6 so as to provide spline engagement therebetween, and the spline engagement enables torque transmission therebetween. The shaft 11 is retained with respect to the inner race 6 by a stopper ring 13.

A center curvature O1 of the track grooves 2 of the outer race 3 is set by being shifted in the axial direction from a joint center O to the opening side of the outer race 3. A center curvature O2 of the track grooves 5 of the inner race 6 is set by being separated in the axial direction from the joint center O by an equal distant f to the inner side which is opposite to the center curvature O1 of the track grooves 2 of the outer race 3.

The cage 8 includes an outer diameter surface 14 which is guided while being held in contact with the inner diameter surface 1 of the outer race 3, an inner diameter surface 15 which is guided while being held in contact with the outer diameter surface 4 of the inner race 6, and pockets 16 for accommodating the balls 7.

The outer diameter surface 14 and the inner diameter surface 15 of the cage 8 are machined surfaces obtained after quenching. That is, in the case where the cage 8 is made of steel material such as medium carbon steel, the outer diameter surface 14 and the inner diameter surface 15 are machined after a thermal curing process (induction quenching, for example). Herein, the induction quenching represents quenching in which a curing process-subjected member is put between coils which carry high-frequency current so that the surface thereof is heated with Joule heat which is generated by eddy current in the surface thereof.

Figure 1:
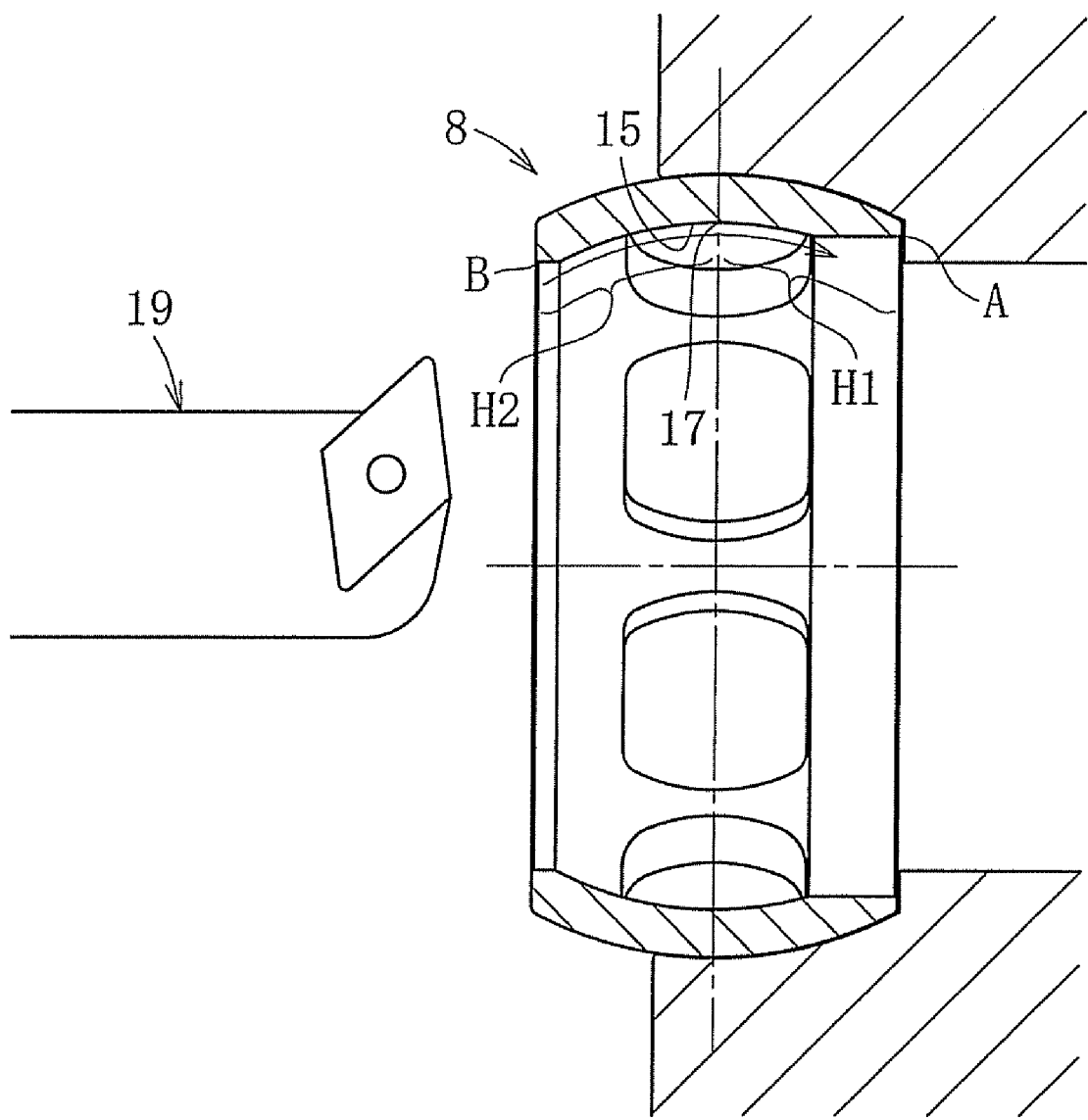
FIG. 1 is a sectional view of a cage for a constant velocity universal joint according to an embodiment of the present invention.

In this case, as illustrated in FIG. 1, the inner diameter surface 15 of the cage 8 is divided in a range H1 extending from an axial center 17 to an end A which corresponds to an opening side of the outer race 3 (hereinafter, sometimes simply referred to as end A corresponding to opening side), and in a range H2 extending from the axial center 17 to an end B which corresponds to an inner side of the outer race 3 (hereinafter, sometimes simply referred to as end B corresponding to inner side). The spherical surface roughnesses in H1 and H2 are different from each other. In this embodiment, the spherical surface roughness in the range H1 is larger than the spherical surface roughness in the range H2. Specifically, when the surface roughness in the range H1 is R1 and the surface roughness in the range H2 is R2, R2<R1<2×R2 is established. Further, the surface roughness R2 in the range H2 is equal to or smaller than Ra: 0.8.

Figure 2:
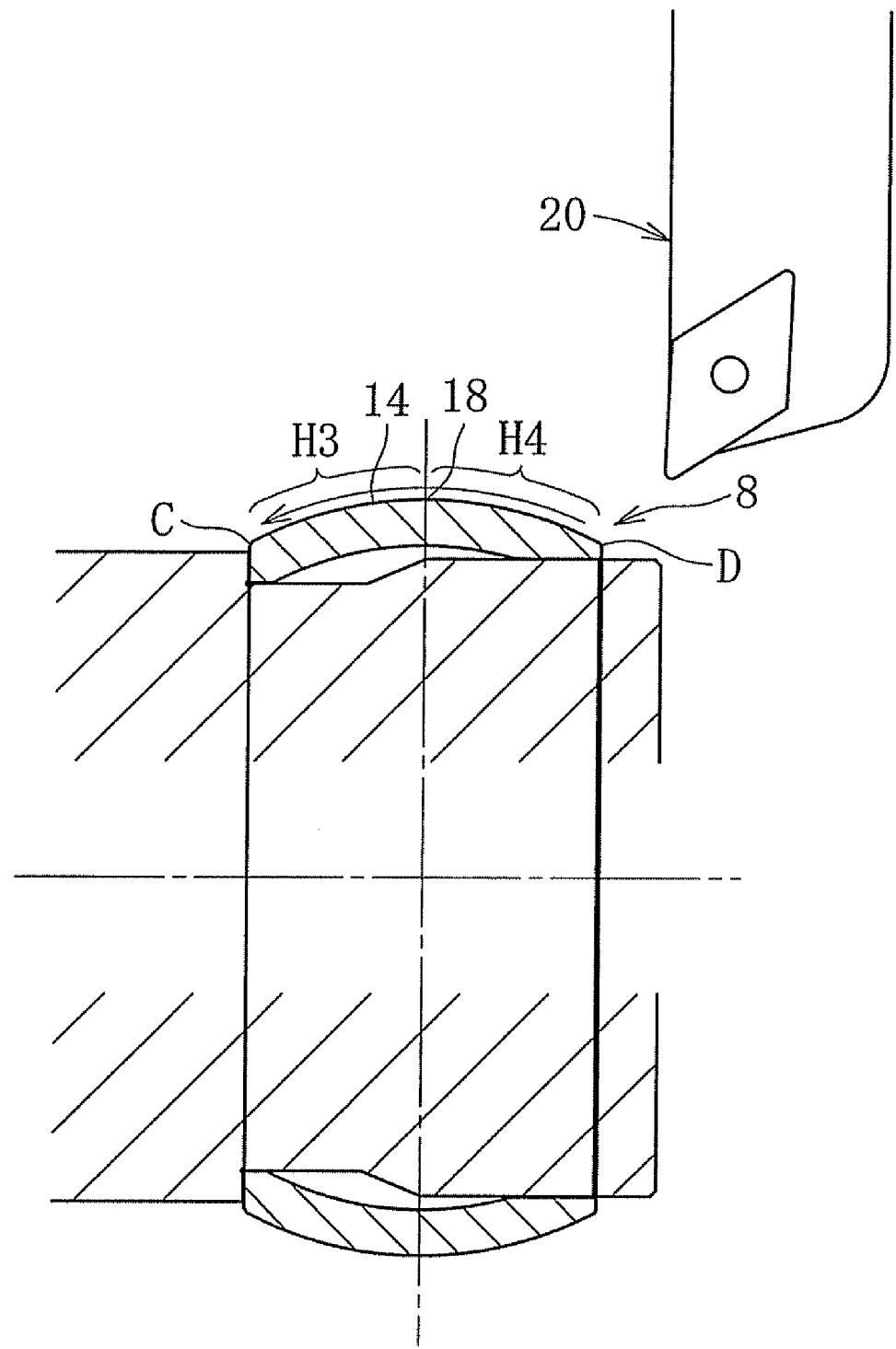
FIG. 2 is a sectional view of the cage.

Meanwhile, as illustrated in FIG. 2, the outer diameter surface 14 of the cage 8 is divided in a range H3 extending from an axial center 18 to an end C which corresponds to an inner side of the outer race 3 (hereinafter, sometimes simply referred to as end C corresponding to inner side), and in a range H4 extending from the axial center 18 to an end D which corresponds to an opening side of the outer race 3 (hereinafter, sometimes simply referred to as end D corresponding to opening side). The spherical surface roughnesses in H3 and H4 are different from each other. In this embodiment, the spherical surface roughness in the range H3 is larger than the spherical surface roughness in the range H4. Specifically, when the surface roughness in the range H3 is R3 and the surface roughness in the range H4 is R4, R4<R3<2×R4 is established. Further, the surface roughness R4 in the range H4 is equal to or smaller than Ra: 0.8.

Herein, the surface roughness represents center-line average roughness, which is obtained by folding back a roughness curve with reference to the center line and by representing a value which is obtained by dividing a value of the area by a measurement length with micrometer (μm), the area being defined by the roughness curve and the center line.

Incidentally, as illustrated in FIG. 1, the machining (grinding) of the inner diameter surface 15 of the cage 8 is performed by moving, as indicated by an arrow, the blade of a tool 19 from the end B side which corresponds to the inner side of the inner diameter surface 15 to the end A side which corresponds to the opening side thereof. In this case, the surface roughness in the range H1 extending from the axial center 17 to the end A side may be larger than the surface roughness in the range H2 extending from the axial center 17 to the end B side. As a result, the finishing which is performed with use of the cutting tool in the range H1 can be roughly completed.

Further, as illustrated in FIG. 2, the machining (grinding) of the outer diameter surface 14 of the cage 8 is performed by moving, as indicated by an arrow, the blade of a tool 20 from the end D side which corresponds to the opening side of the outer diameter surface 14 to the end C side which corresponds to the inner side thereof. In the outer diameter surface 14 of the cage 8, the surface roughness in the range H3 extending from the axial center 18 to the end C side may be larger than the surface roughness in the range H4 extending from the axial center 18 to the end D side. As a result, the finishing which is performed with use of the cutting tool in the range H3 can be roughly completed.

In the present invention, in the range H1 extending from the axial center 17 of the inner diameter surface 15 of the cage 8 to the end A side which corresponds to the opening side, and in the H3 extending from the axial center 18 of the outer diameter surface 14 to the end C side which corresponds to the inner side, the finishing which is performed with use of the cutting tool can be roughly completed. Therefore, the abrasion of the cutting tool can be reduced. In this manner, the life of the cutting tool can be extended, which leads to reduction in manufacturing cost.

Note that, conversely to the above-mentioned embodiment, the spherical surface roughness in the range H2 extending from the axial center 17 of the inner diameter surface 15 to the end B side which corresponds to the inner side may be larger than the spherical surface roughness in the range H1 extending from the axial center 17 to the end A side which corresponds to the opening side. However, the track grooves 2 of the outer race 3 open on the inlet side (opening side), and hence the influence on the function of the constant velocity universal joint is reduced in the case where the spherical surface roughness in the range H1 extending from the axial center 17 to the end A side which corresponds to the opening side is made larger than the spherical surface roughness in the range H2 extending from the axial center 17 to the end B side which corresponds to the inner side. For this reason, as in the embodiment illustrated in FIG. 1, it is preferred that the spherical surface roughness in the range H1 extending from the axial center 17 to the end A side be larger (than the spherical surface roughness in the range H2).

Further, also in the outer diameter surface 14 of the cage 8, the spherical surface roughness in the range H4 extending from the axial center 18 to the end D side which corresponds to the opening side may be larger than the spherical surface roughness in the range H3 extending from the axial center 18 to the end C side which corresponds to the inner side. However, similarly to the above description, for the reason that the influence on the function of the constant velocity universal joint is reduced, it is preferred that the spherical surface roughness in the range H3 extending from the axial center 18 of the outer diameter surface 14 to the end C side which corresponds to the inner side be larger than the spherical surface roughness in the range H4 extending from the axial center 18 to the end D side which corresponds to the opening side.

Specifically, when the spherical surface roughness in the range extending from the axial center 17 of the outer diameter surface 15 to the end A side which corresponds to the opening side is R1, and the spherical surface roughness in the range extending from the axial center 17 of the inner diameter surface 15 to the end B side which corresponds to the inner side is R2, R2<R1<2×R2 is established. As a result, the life of the tool can be largely extended.

Specifically, when the spherical surface roughness in the range extending from the axial center 18 of the outer diameter surface 14 of the cage 8 to the end C side which corresponds to the inner side is R3, and the spherical surface roughness in the range extending from the axial center 17 of the outer diameter surface 14 to the end D side which corresponds to the opening side is R4, R4<R3<2×R4 is established. As a result, the life of the tool can be largely extended.

Further, when the spherical surface roughness in the range extending from the axial center 17 of the inner diameter surface 15 to the end B side which corresponds to the inner side or the spherical surface roughness in the range extending from the axial center 18 of the outer diameter surface 14 to the end D side which corresponds to the opening side is equal to or smaller than Ra: 0.8, the influence on the function of the constant velocity universal joint can be extremely reduced. Note that, when the spherical surface roughness in the range extending from the axial center 17 of the inner diameter surface 15 to the end B side which corresponds to the inner side or the spherical surface roughness in the range extending from the axial center 18 of the outer diameter surface 14 to the end D side which corresponds to the opening side exceeds Ra: 0.8, the surface is excessively rough. Thus, there is a risk that it is impossible to smoothly form an operational angle in the case where the constant velocity universal joint is constructed by the cage 8.

As described above, the embodiment of the present invention is described. In this context, the present invention is not limited to the above-mentioned embodiment, and various modifications can be made thereto. For example, while the constant velocity universal joint of a Barfield type (BJ) is illustrated in FIG. 3, constant velocity universal joints of other types such as an undercut-free type (UJ) may be used. Further, the number of the balls 7 can be arbitrarily set. Specifically, while being able to be set within the range of three to eight, the number of the balls 7 is not limited thereto. Further, a curing process except the induction quenching, such as carburizing and quenching, or nitriding may be adopted.

Further, the spherical surface roughnesses on the end side which corresponds to the opening side and on the end side which corresponds to the inner side with respect to the axial center as a boundary line of only one of the inner diameter surface 15 and the outer diameter surface 14 of the cage 8 may be different from each other.

Figure 4:
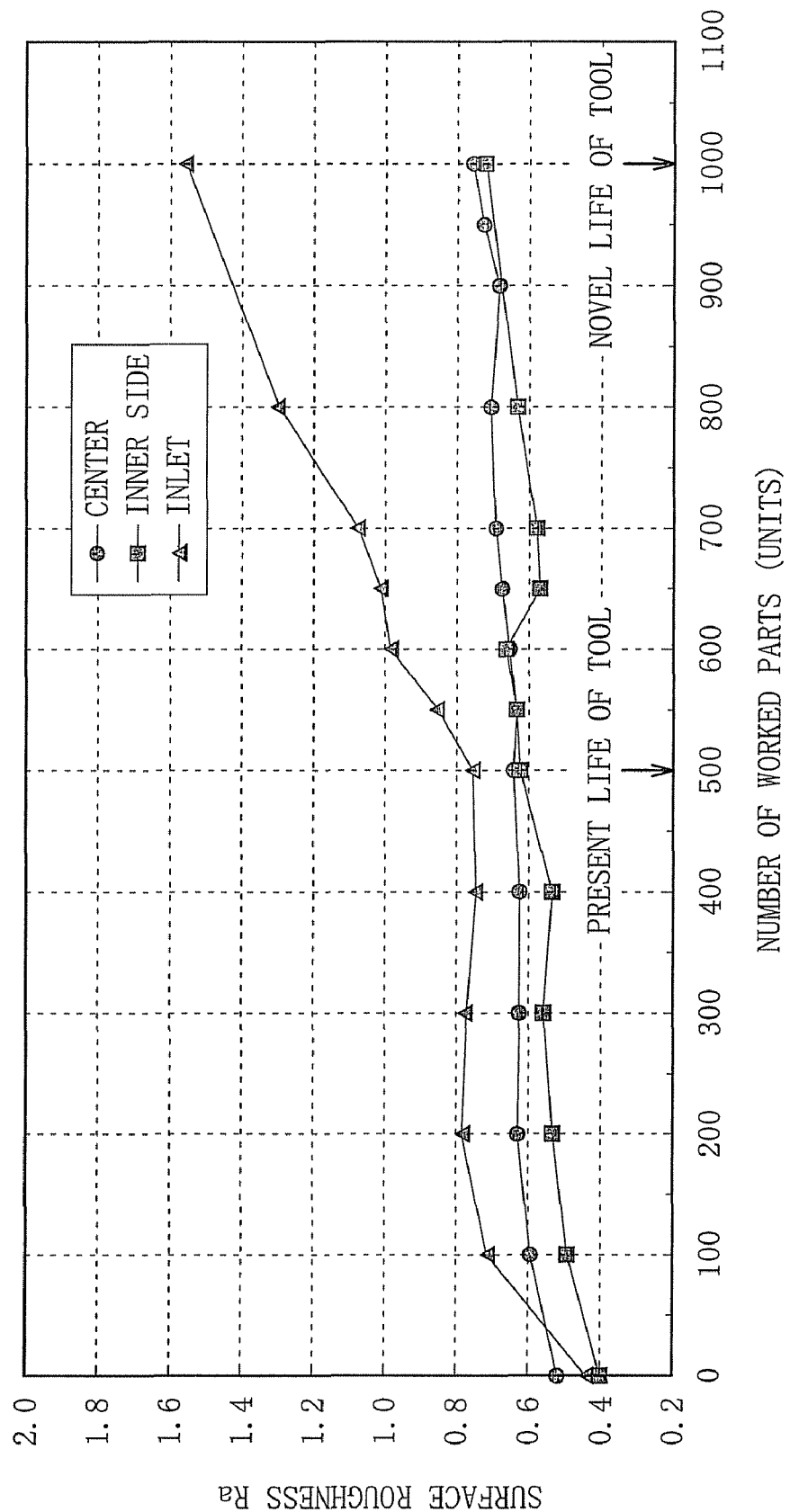
FIG. 4 is a graph diagram showing a relation between a surface roughness and a life of a cutting tool.

FIG. 4 shows a relation between the number of workings of the cage inner diameter surface, which can be performed with use of one cutting tool, and the surface roughness thereof. In FIG. 4, ● denotes a surface roughness at the axial center 17 of the inner diameter surface 15, ■ denotes a surface roughness of the inner diameter surface 15 on the end B side which corresponds to the inner side, and ▲ denotes a surface roughness of the inner diameter surface 15 on the end A side which corresponds to the inlet side (opening side).

In the case where the surface roughness is uniform over the entire region of the inner diameter surface 15 of the cage 8, when the number of workings exceeds approximately five hundred, the surface roughness of the inner diameter surface 15 on the end A side (refer to FIG. 1) which corresponds to the opening side becomes larger. At the time point when the roughness on the end A side which corresponds to the opening side cannot be secured equally to the surface roughness on the end B side corresponding to the inner side and the surface roughness at the axial center any longer as described above, the life of the tool comes to an end. However, as in the present invention, in the case where the surface roughness on the end A side which corresponds to the opening side may be larger than the surface roughness on the end B side which corresponds to the inner side, the life of the tool can be extended so as to increase the number of workings to one thousand, for example. Further, while the graph of the relation between the number of workings and the surface roughness of the outer diameter surface 14 of the cage 8 is omitted, through adoption of the structure of the present invention, the outer diameter surface 14 of the cage 8 is capable of extending the life of the tool as well as the inner diameter surface 15.

The invention claimed is:

1. A cage for a constant velocity universal joint, comprising:
    an outer diameter surface configured to be guided by an outer joint member;
    an inner diameter surface configured to be guided by an inner joint member; and
    pockets for accommodating multiple balls which are capable of being interposed between the outer joint member and the inner joint member,
    wherein the inner diameter surface has a spherical surface roughness in a range extending from an axial center of the inner diameter surface to an end side of the inner diameter surface which corresponds to an opening side of the outer joint member that is larger than a spherical surface roughness in a range extending from the axial center of the inner diameter surface to an end side of the inner diameter surface which corresponds to an inner side of the outer joint member.

2. The cage for a constant velocity universal joint according to claim 1, wherein, when the spherical surface roughness in the range extending from the axial center of the inner diameter surface to the end side of the inner diameter surface which corresponds to the opening side of the outer joint member is R1, and the spherical surface roughness in the range extending from the axial center of the inner diameter surface to the end side of the inner diameter surface which corresponds to the inner side Of the outer joint member is R2, R2<R1<2×R2 is established.

3. The cage for a constant velocity universal joint according to claim 2, wherein the spherical surface roughness in the range extending from the axial center of the inner diameter surface to the end side of the inner diameter surface which corresponds to the inner side of the outer joint member is equal to or smaller than Ra: 0.8 µm.

4. A cage for a constant velocity universal joint, comprising:
    an outer diameter surface configured to be guided by an outer joint member;
    an inner diameter surface configured to be guided by an inner joint member; and pockets for accommodating multiple balls which are capable of being interposed between the outer joint member and the inner joint member, wherein the outer diameter surface has a spherical surface roughness in a range extending from an axial center of the outer diameter surface to an end side which of the outer diameter surface corresponds to an inner side of the outer joint member that is larger than a spherical surface roughness in a range extending from the axial center of the outer diameter surface to an end side of the outer diameter surface which corresponds to an opening side of the outer joint member.

5. The cage for a constant velocity universal joint according to claim 4, wherein, when the spherical surface roughness in the range extending from the axial center of the outer diameter surface to the end side of the outer diameter surface which corresponds to the inner side of the outer joint member is R3, and the spherical surface roughness in the range extending from the axial center of the outer diameter surface to the end side of the outer diameter surface which corresponds to the opening side of the outer joint member is R4, R4<R3<2× R4 is established.

6. The cage for a constant velocity universal joint according to claim 5, wherein the spherical surface roughness in the range extending from the axial center of the outer diameter surface to the end side of the outer diameter surface which corresponds to the opening side of the outer joint member is equal to or smaller than Ra: 0.8 μm.

* * * * *